(12) United States Patent
Kato et al.

(10) Patent No.: US 6,438,085 B1
(45) Date of Patent: Aug. 20, 2002

(54) OPTICAL RECORDING METHOD

(75) Inventors: Tatsuya Kato; Isamu Kuribayashi; Hajime Utsunomiya; Takashi Kikukawa, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/398,040

(22) Filed: Sep. 17, 1999

(30) Foreign Application Priority Data

Oct. 28, 1998 (JP) .............................. 10-322807

(51) Int. Cl.$^7$ ................................ G11B 7/00
(52) U.S. Cl. .................................. 369/59.12
(58) Field of Search .................... 369/59.11, 59.12, 369/124.4, 116, 47.5

(56) References Cited

U.S. PATENT DOCUMENTS

| | | | | |
|---|---|---|---|---|
| 5,469,422 A | * | 11/1995 | Sohmuta | 369/100 |
| 5,761,179 A | * | 6/1998 | Iwasaki et al. | 369/116 |
| 5,802,032 A | * | 9/1998 | Jacobs et al. | 369/59 |
| 6,040,030 A | | 3/2000 | Utsunomiya et al. | |

FOREIGN PATENT DOCUMENTS

| | | |
|---|---|---|
| JP | 9-7176 | 1/1997 |
| JP | 9-138947 | 5/1997 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

In the recording of an optical recording medium of phase change type according to the present invention, favorable properties are realized even when the recording is effected in a wide range of linear velocity. The optical recording method of the present invention is a method for recording an optical recording medium comprising a substrate and a recording layer of phase change type on the substrate. A pulse train is used as the recording waveform for laser beam modulation during the formation of one recording mark. The pulse train includes at least one unit pulse comprising an upward pulse and a subsequent downward pulse, and the relation (I):

$$0.25 \leq (TclH/TclL) \times n \leq 1.25 \qquad (I).$$

is satisfied when width of the last downward pulse standardized by the reciprocal of linear velocity is TclH at a linear velocity of V and TclL at a linear velocity of V/n (n is a real number greater than 1).

2 Claims, 1 Drawing Sheet

OPTICAL RECORDING METHOD

BACKGROUND OF THE INVENTION

1. Field of the Invention

This invention relates to a method for recording an optical recording disc of phase change type.

2. Prior Art

Highlight is recently focused on optical recording media capable of recording information at a high density and erasing the recorded information for overwriting. One typical overwritable optical recording media is a phase change optical recording medium wherein a laser beam is directed to the recording layer to change its crystalline states whereupon a change of reflectance by the crystallographic change is detected for reproduction of the information.

The phase change optical recording media are of great interest since the medium can be overwritten by modulating the intensity of a single laser beam and the optical system of the drive unit used for their operation is simple.

When information is recorded in the optical recording medium of phase change type, the laser beam applied is of the power (recording power) such that the recording layer is heated to a temperature higher than the melting point. In the region where the recording power is applied, the recording layer is melted and thereafter quenched to form an amorphous record mark. When the record mark is erased, a laser beam of the power (erasing power) such that the recording layer is heated to a temperature higher than the crystallizing temperature and lower than the melting temperature is applied. The record mark to which the laser beam of erasing power is applied is heated to a temperature higher than the crystallizing temperature and then allowed to slowly cool to recover the crystalline state. Accordingly, in the optical recording media of the phase change type, the medium can be overwritten by modulating the intensity of a single laser beam.

In an optical recording medium of phase change type, thermal behavior in the recording and the erasure is greatly affected by the relative velocity of the laser beam in relation to the medium, namely, by the linear velocity of the medium. When the composition of the recording layer and the thermal structure of the medium are optimized to realize optimal properties at a particular linear velocity, the medium suffers from the problems as described below. When the linear velocity adopted is faster than the above-mentioned particular linear velocity, cooling rate of the recording layer will be too fast to render the crystallization of the record marks, namely, erasure difficult. On the other the hand, when the linear velocity adopted is slower than the above-mentioned particular linear velocity, cooling rate of the recording layer will be too slow, and amorphousizing of the record marks will be difficult. Formation of the record marks of accurate shape will then become difficult.

An optical recording medium of phase change type, however, is required to show satisfactory overwriting properties in a wide range of linear velocity. For example, a high linear velocity is required in order to reduce the time of overwriting while a real time recording is sometimes required in the recording of image or music. When a drive system compliant with a higher linear velocity is introduced in the market, it is usual that an economical drive system compliant only with the low linear velocity is simultaneously sold, and compatibility between the systems should be taken into consideration.

Optical recording methods attempting to support different linear velocities are disclosed, for example, in JP-A 7176/1997 and 138947/1997. These methods attempt to realize an optical recording medium of phase change type wherein the recording waveform for forming one record mark is constituted from a pulse train, and different linear velocities are supported by controlling width of each pulse and width of the downward pulse subsequent to each pulse depending on the linear velocity.

The inventors of the present invention, however, have found that an optical recording medium can not be made compliant with a wide range of linear velocity even if the recording waveform used were a pulse train and the width of each pulse and the subsequent downward pulse were controlled as described in JP-A 7176/1997 and 138947/1997.

SUMMARY OF THE INVENTION

In view of the situation as described above, an object of the present invention is to enable overwriting of an optical recording medium of phase change type whereby favorable properties are realized in a wide range of linear velocity.

In view of the situation as described above, an object of the present invention is to enable overwriting of an optical recording medium of phase change type whereby favorable properties are realized in a wide range of linear velocity.

The object as described above is attained by any one of (1) and (2) as described below.

(1) A method for recording an optical recording medium comprising a substrate and a recording layer of phase change type on the substrate; wherein a pulse train is used as the recording waveform for laser beam modulation during formation of one recording mark, said pulse train including at least one unit pulse comprising an upward pulse and a subsequent downward pulse; and relation (I):

$$0.25 \leq (TclH/TclL) \times n \leq 1.25 \quad (I).$$

is satisfied when width of the last downward pulse standardized by the reciprocal of linear velocity is TclH at a linear velocity of V and TclL at a linear velocity of V/n (n is a real number greater than 1).

(2) An optical recording method according to the above (1) wherein unit pulses excluding the top and the last unit pulses satisfy the relation (II):

$$0.55 \leq (TmpH/TmpL)/n \leq 1.20 \quad (II)$$

when proportion of width of the upward pulses is TmpH at a linear velocity of V, and TmpL at a linear velocity of V/n.

DETAILED DESCRIPTION OF THE INVENTION

Figure 1:
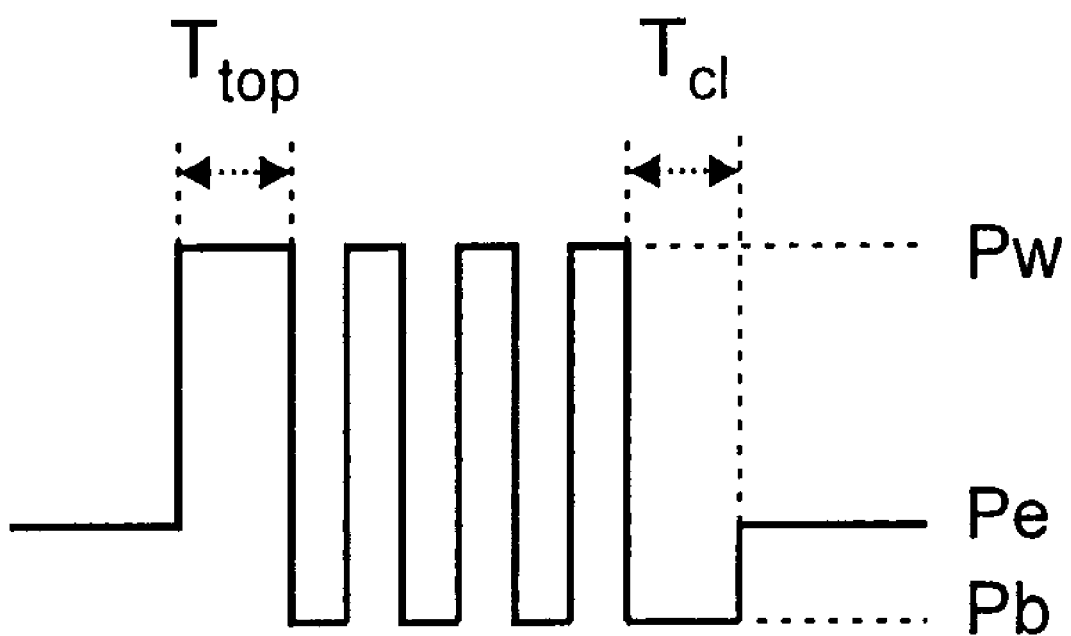
FIG. 1 is a schematic view of the recording waveform in the present invention.

A typical recording waveform used in the present invention is shown in FIG. 1. This recording waveform is used in forming one recording mark, and comprises a pulse train. In FIG. 1, Pw indicates recording power level, Pe indicates erasing power level, and Pb indicates bias power level. The pulse train is of the structure wherein a combination of an upward pulse (at an intensity of Pw) and the subsequent downward pulse (at an intensity of Pb) is repeated (the combination being herein referred to as the "unit pulse"), and as a whole, the pulse train rises from Pe and returns to Pe. In the present invention, the upward pulse in the first unit pulse is referred to as the "top pulse", and the downward pulse in the last unit pulse is referred to as the "cooling pulse". In FIG. 1, width of the top pulse is indicated as Ttop, and width of the cooling pulse is indicated as Tcl.

The pulse width used in the present invention is a standardized pulse width which has been standardized by the reciprocal of the linear velocity. In this case, when the modulation code is not changed with the alteration in the linear velocity, reference clock width is varied inversely with the linear velocity, and length of the mark actually formed on the medium will be constant irrespective of the linear velocity employed as long as the mark recorded is of the same signal. For example, reference clock width is doubled when the linear velocity is reduced to ½. Such an alteration of the reference clock width corresponding to the linear velocity of the medium is a method well known in the art as disclosed in JP-A 7176/1997, supra. It should be noted that different modulation codes may be used at the higher linear velocity and at the lower linear velocity.

In the present invention, width of the cooling pulse is altered in accordance with the linear velocity. More illustratively, width of the cooling pulse is controlled in relation to the linear velocity such that relation (I):

$$0.25 \leq (TclH/TclL) \times n \leq 1.25 \tag{I}$$

is satisfied when width of the last downward pulse standardized by the reciprocal of linear velocity is TclH at a linear velocity of V and TclL at a linear velocity of V/n (n is a real number greater than 1). When (TclH/TclL)×n is too large, namely, when width of the cooling pulse is insufficiently increased with the decrease in the linear velocity, the record mark formed will be unduly short since heat is conducted from the rear end portion of the record mark to the region which is supposed to be the amorphous region to induce crystallization during the formation of the rear end portion of the record mark. This results in an increased jitter. When (TclH/TclL)×n is too small, namely, when width of the cooling pulse is excessively increased with the decrease in the linear velocity, cooling effect of the rear end portion of the record mark will be too strong, and all of the region that has been once melted will become amorphous, and hence, will be included in the record mark. The resulting record mark will be unduly long, and the jitter will be increased. (TclH/TclL)×n is preferably in the range of from 0.45 to 1.05.

In the present invention, it is also preferable to control the proportion of the width of the upward pulses in the unit pulses excluding the top and the last unit pulses, namely, duty ratio of the unit pulses in relation to the linear velocity such that the unit pulses excluding the top and the last unit pulses satisfy the relation (II):

$$0.55 \leq (TmpH/TmpL)/n \leq 1.20 \tag{II}$$

when proportion of the width of the upward pulses is TmpH at a linear velocity of V, and TmpL at a linear velocity of V/n (n is a real number greater than 1). When (TmpH/TmpL)/n is too high, namely, when the duty ratio is excessively reduced with the decrease in the linear velocity, heating for the record mark formation will be insufficient. When the power level of the downward pulses is reduced to below the erasing power, heating required for the erasure will be insufficient. The jitter will be unduly increased in both cases. On the other hand, when (TmpH/TmpL)/n is too low, namely, when the duty ratio is insufficiently reduced with the decrease in the linear velocity, the heat conducted to the front end portion of the record mark will be increased to invite recrystallization of the once formed amorphous region. The jitter will be also increased in such a case. (TmpH/TmpL)/n is preferably in the range of from 0.65 to 1.05. To avoid excessive complication of the pulse control circuit, width of the upward pulse in each unit pulse is preferably the same although the upward pulses may also have different widths.

JP-A 7176/1997, supra proposed not only the alteration of the reference clock width in inverse proportion to the linear velocity, but also pulse division of the recording waveform for a mark length of nT (T: reference clock width). In JP-A 7176/1997, the number of pulse division is m (=n, n-1, n-2). JP-A 7176/1997 also discloses that a pulse train may be constituted such that the width of the upward pulse is decreased with the decrease in the linear velocity. Differently stated, in such constitution, the width of the downward pulse is increased with the decrease in the linear velocity. In example 7 of JP-A 7176/1997, there is disclosed for the recording of an optical recording medium of phase change type at double linear velocity of CD (compact disc), that jitter could be reduced when the top pulse had a width of 1 T and other upward pulses and downward pulses had a width of 0.5 T. For the recording of the same medium at single linear velocity of CD, there is disclosed that the jitter could be reduced when the top pulse had the same width and other upward pulses had a width of 0.33 T (and the downward pulses had a width of 0.67 T). In this example, however, the value of (TclH/TclL)×n is 1.49 ((0.50/0.67)×2), which is in excess of the range defined by the relation (I) as described above.

Since the top pulse is a pulse that rises from the erasing power, temperature increase is likely to be insufficient when the width of the top pulse is the same as other upward pulses. Therefore, the top pulse preferably has a width longer than other upward pulses. It should be noted that a downward pulse with the power level lower than the erasing power may be provided immediately before the top pulse as described in the JP-A 7176/1997.

The last upward pulse may have a width the same as other upward pulses excluding the top pulse. The last upward pulse, however, may have a width different from other upward pulses if necessary.

The width of the recording waveform for forming a record mark having a signal length of nT is not necessarily nT. When the duration of the laser beam irradiation is nT, the length of the record mark is likely to be too long due to the heat conduction in the track direction, and therefore, it is usual to employ a width of the record waveform shorter than the real signal length.

Next, power level of the pulses is described. The power level of the cooling pulse (Pb in FIG. 1) should be lower than Pe. Although the power level of other downward pulses is Pb in FIG. 1, other downward pulses may have a power level different from Pb, for example, a power level the same as Pe. The power level of other downward pulses, however, should not exceed Pe to exert sufficient effects as the downward pulses. In addition, the power level of the downward pulses should be greater than 0 for the purpose of tracking servo. The upward pulses may have the same power level, or if desired, different power levels.

The present invention is applicable in mark length recording system. Use of the present invention is preferable when two or more linear velocities are used in CLV (constant linear velocity) system, or when effects on recording properties caused by the difference in linear velocity between the outer region and the inner region is to be eliminated in CAV (constant angular velocity) system.

It should be noted that the recording method of the present invention is most preferably used when recording is conducted at a linear velocity in the range of from V to V/n on an optical recording medium whose optimal linear velocity is approximately V. In other words, the method of the present invention is most effective for widening the margin to the direction of lower linear velocity. Practically allowable upper limit of n is generally in about n=4 although such upper limit varies with the margin of the optical recording medium itself.

EXAMPLES

Examples of the present invention are given below by way of illustration and not by way of limitation.

Examples and Comparative Examples

A land/groove double spiral disc shaped substrate having a diameter of 120 mm and a thickness of 0.6 mm was prepared by injection molding polycarbonate. Grooves were simultaneously formed in the injection molding of the substrate to a depth of 65 nm and width of 0.6 $\mu$m at a pitch of 1.2 $\mu$m. On the grooved surface of the substrate, there were formed a first dielectric layer, a recording layer, a second dielectric layer, a reflective layer, and a protective layer by the procedure as described below to produce the optical recording disc samples.

The first dielectric layer was of double-layer structure, and the layers were formed by sputtering in argon atmosphere. The layer on the side of the substrate was formed by using ZnS (85 mol %)—SiO$_2$ (15 mol %) for the target, and the layer on the side of the recording layer was formed by using ZnS (50 mol %)—SiO$_2$ (50 mol %) for the target. The layer on the side of the substrate was formed to a thickness of 185 nm, and the layer on the side of the recording layer was formed to a thickness of 15 nm.

The recording layer was formed by sputtering using Ag-In-Sb-Te for the target. The recording layer was formed to a thickness of 23 nm.

The second dielectric layer was formed in argon atmosphere using ZnS (50 mol %)—SiO$_2$ (50 mol %) for the target. The second dielectric layer was formed to a thickness of 20 nm.

The reflective layer was formed by sputtering in argon atmosphere using Al—1.7 at % Cr for the target. The reflective layer 5 was formed to a thickness of 100 nm.

The protective layer was formed by applying a UV curable resin by spin coating and exposing it to UV for curing. The protective layer as cured had a thickness of 5 $\mu$m.

The thus produced samples were initialized by a bulk eraser. The initialized samples were then evaluated for their properties on an optical recording medium evaluator at a linear velocity of 3.5 m/s (clock frequency: 26.16 MHz) or 7 m/s (clock frequency: 52.32 MHz) by using the recording pulse pattern as shown in FIG. 1. Other recording conditions were as described below.

Laser wavelength: 635 nm

NA: 0.6

Recording signal: 8–16 modulation signal

Shortest mark length: 0.40 $\mu$m

Recording power, Pw: 14.0 mW

Erasing power Pe: 6.0 mW

Bias Power Pb: 0.5 mW

The properties were evaluated by combining the cooling pulse width Tcl standardized by the reference clock width T with the duty ratio of the unit pulses (excluding the top and the last unit pulses) as shown in Table 1, and measuring clock jitter at different linear velocities. In Table 1, the linear velocity V was 7 m/s, and the linear velocity V/n is 3.5 m/s (n=2); and the value obtained by dividing the Tcl at the linear velocity V with the Tcl at the linear velocity V/2 is equal to the value of (TclH/TclL). In Table 1, (TclH/TclL)×n and (TmpH/TmpL)/n are indicated. Width of the top pulse was 0.5 T in all cases. Width of the downward pulse in the first unit pulse, and width of the upward pulse in the last unit pulse were the same as the pulses of other unit pulses.

The clock jitter was evaluated by measuring the reproduced signal with a time interval analyzer after 10 overwriting operations, and calculating $\sigma$/T (%) wherein the window width of T. The results are shown in Table 1.

TABLE 1

| | | Tcl (T) | | | | | Clock jitter (%) | |
|---|---|---|---|---|---|---|---|---|
| Combination | Linear velocity | Linear velocity | (Tcl$_H$/Tcl$_L$)/ | Duty ratio | | (Tmp$_H$/Tmp$_L$)/ | Linear velocity | Linear velocity |
| No. | V | V/2 | n | Tmp$_H$ | Tmp$_L$ | n | V | V/2 |
| 1 | 0.50 | 1.50 | 0.67 | 0.38 | 0.24 | 0.79 | 9.4 | 8.2 |
| 2 (comp.) | 0.64 | 1.00 | 1.28** | 0.38 | 0.24 | 0.79 | 12.3 | 12.3 |
| 3 (comp.) | 0.26 | 2.20 | 0.24** | 0.38 | 0.24 | 0.79 | 12.4 | 12.5 |
| 4 | 0.50 | 1.50 | 0.67 | 0.44 | 0.18 | 1.22* | 11.6 | 11.3 |
| 5 | 0.50 | 1.50 | 0.67 | 0.34 | 0.32 | 0.53* | 11.3 | 11.4 |

**: Outside the scope of the invention
*: Outside the preferable range of the present invention The benefits of the present invention are apparent in Table 1. The Combination Nos. 2 and 3 which do not satisfy the relation (I) suffered from a markedly increased clock jitter. On the contrary, the clock jitter was reduced in Combination Nos. 1, 4 and 5 wherein (TclH/TclL)×n was designed to satisfy the relation (I). In Combination No. 1 wherein (TmpH/TmpL)/n is also designed to satisfy the relation (II), the clock jitter was markedly reduced.

BENEFITS OF THE INVENTION

In the recording of an optical recording medium of phase change type according to the present invention, the medium is recorded at different linear velocities, and a cooling pulse of predetermined width compliant with the particular linear velocity is included in the recording waveform. As a consequence, favorable properties are realized in a wide range of linear velocity.

Japanese Patent Application No. 322807/1998 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for recording on an optical recording medium including a substrate and a phase change recording layer on the substrate, comprising:

forming at least one recording mark by a pulse train used as a recording waveform for laser beam modulation during a formation of said at least one recording mark, said pulse train including at least one unit pulse comprising an upward pulse and a subsequent downward pulse and satisfying the following relation:

$$0.25 \leq (TclH/TclL) \times n \leq 1.25,$$

where TclH is a width of a last downward pulse in the pulse train standardized by a reciprocal of a linear velocity V, TclL is a width of a last downward pulse in the pulse train standardized by a reciprocal of a linear velocity of V/n, and n is a real number greater than 1.

2. An optical recording method according to claim 1, wherein at least one upward pulse, excluding a top unit pulse and a last unit pulse, satisfies the following relation:

$$0.55 \leq (TmpH/TmpL)/n \leq 1.20,$$

where TmpH is a width of the at least one upward pulse at the linear velocity of V, and TmpL is a width of the at least one upward pulse at the linear velocity of V/n.

* * * * *